(12) United States Patent
Amano

(10) Patent No.: US 7,895,259 B2
(45) Date of Patent: Feb. 22, 2011

(54) METHOD FOR PREVENTING USE OF MULTIPLE APPLICATION INSTANCES

(75) Inventor: Tomio Amano, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 12/055,929

(22) Filed: Mar. 26, 2008

(65) Prior Publication Data

US 2009/0248783 A1    Oct. 1, 2009

(51) Int. Cl.
*G06F 15/16* (2006.01)
(52) U.S. Cl. .................. 709/201; 709/203; 709/227
(58) Field of Classification Search ......... 709/201–203, 709/217–229
See application file for complete search history.

(56) References Cited

U.S. PATENT DOCUMENTS 7,373,408 B2 * 5/2008 Walls et al. ................. 709/227
2003/0037108 A1 * 2/2003 Peiffer et al. ................ 709/203
2006/0075110 A1 * 4/2006 Seraphin ..................... 709/227
2007/0245409 A1 * 10/2007 Harris et al. ................... 726/5
2008/0056201 A1 * 3/2008 Bennett ....................... 370/334

FOREIGN PATENT DOCUMENTS

| JP | 08-212042 | 8/1996 |
| JP | 09-274553 | 10/1997 |
| JP | 2002-023912 | 1/2002 |

* cited by examiner

*Primary Examiner*—Yasin Barqadle
(74) *Attorney, Agent, or Firm*—Schmeiser, Olsen & Watts; John Pivnichny

(57) ABSTRACT

A method and apparatus are provided for managing activation of one or more application instances in a client machine in communication with a server across a network. The client machine is configured with a manager local to the client machine to manage the application instances. Data associated with the application instance(s) is maintained on the client machine. Prior to sending a communication to the server for an application, the manager ensures that an application instance is not present and activated local to the client machine for the same application. Accordingly, management of the application instances is maintained local to the client machine.

15 Claims, 3 Drawing Sheets

METHOD FOR PREVENTING USE OF MULTIPLE APPLICATION INSTANCES

BACKGROUND OF THE INVENTION

1. Technical Field

This invention relates to employment of multiple application instances on a client machine. More specifically, the invention relates to managing opening of multiple application instances for a single application.

2. Description of the Prior Art

In a computer system, a window is a rectangular area on a visual display. Most operating systems and applications have a graphical user interface that divides the visual display into one or more windows. A different program may run within each window, or different data may be displayed within each window.

Windows are particularly useful in multitasking environments, which allow a user to execute several programs at once. By dividing the visual display into multiple windows, output from the executing programs may be allocated to different windows and displayed at the same time. Selection of a window in a multiple window environment is facilitated with use of an input device and movement of a cursor to a select window.

In addition to dividing the visual display into one or more windows, the graphical user interface may enable the user to set the dimensions and position of each window. For example, in one embodiment windows can be arranged so that they do not overlap, while in another embodiment, windows can be arranged to overlap. Overlaid windows, which are also known as cascading windows, resemble a stack of paper lying on top of one another, with only the top window displayed in full. By positioning and employing the input device on a portion of a partially visible window, the selected window can be moved to the top of the stack. Similarly, any window can be selected to fill the entire size of the visual display by selecting a full display size function of the window.

In addition to moving windows, changing their size, popping, and zoom features, each window can be minimized and replaced with an icon. In one embodiment, an icon is a small picture that represents the program running in the window. By converting the window to an icon, space on the visual display is made available for other windows while continuing to allow direct access to the minimized window through the icon.

It is known in the art that some computer systems require a limit to the quantity of windows open at a given time, wherein each window is associated with an application instance. As explained above, each window may be executing a different program. The ability for the computer to execute multiple programs at the same time is limited by the physical hardware present in the computer. For example, limitations may be present based upon the processor unit employed, the hardware memory employed, the storage media available, etc. Accordingly, there are some restrictions on the quantity of windows available based upon the innate characteristics of the hardware of the computer itself.

In a web based application, an operation method is sometimes employed such that various application menus are displayed in a single window, known as a parent window. FIG. 1 is a prior art block diagram (100) showing a parent window (110) residing on a server (105) and two child windows (120) and (130) residing on a single client machine (140). The parent window (110) is shown displaying a menu of multiple applications (112), (114), and (116) that may be started and displayed in a new child window. As shown, selection of application A (112) results in creation of a first child window (120) with application A (122) shown in the window (120). Similarly, selection of application B (114) results in creation of a second child window (130) with application B (132) shown in the window (130). Accordingly, by employing a separate window for each application, users can simultaneously utilize multiple applications by switching focus between the child windows (120) and (130).

However, there are situations that arise in the simultaneous use of applications in multiple windows that can cause errors within the applications themselves. One example of an error prone situation is when a first application (122) is started on a first child window (120) and the same application (122) is started on a second child window (130) in the same client machine (140). In a web based environment, interference of the first executing application (122) in the first child window (120) with the same application (122) in the second child window (130) may cause a data mismatch. Another example of a data mismatch is when multiple applications exclusively use a single resource. Accordingly, there is a need to manage session data in a windows environment that mitigates data mismatch among multiple windows and their associated applications.

SUMMARY OF THE INVENTION

This invention comprises a method and apparatus for management of child window of a client machine associated with one or more applications residing on a server.

In one aspect of the invention, a method is employed to manage application instances in a computing environment. Prior to sending a request from a client machine to a server to select a first application from the server to operate in a first application instance on the client machine, it is determined whether the first application is active in a second application instance of the client machine. The determination is performed local to the client machine. The client machine sends the request to the server in response to the determination that the first application is inactive in the second application instance of the client machine. Conversely, the client machine withholds sending the request to the server in response to the determination that the first application is active in the second application instance of the client machine.

In another aspect of the invention, a computer system is provided with a server machine having a processor in communication with memory and storage media, and a client machine having a processor in communication with memory. The client machine is in communication with the server across a network. A client manager local to the client machine is provided to determine whether a first application is active in a first application instance of a local visual display prior to a send of a request from the client machine to the server for selection of a first application to operate in a second application instance local to the client machine. The client manager communicates a request to the server for selection of the first application in response to the determination that the first application is inactive in the first application instance local to the client machine. Conversely, the client manager withholds communication of the request to the server in response to the determination that the first application is active in the first application instance of the local client machine.

In yet another aspect of the invention, an article if provided with a computer readable carrier including computer program instructions configured to manage application instances in a computer environment. Instructions local to a client machine in communication with a server are provided to determine whether a first application is active in a first application instance of the client machine prior to sending a request from the client machine to the server to select the first application from the server to operate in a second application instance on the client machine. In addition, instructions are provided to send the request to the server in response to the determination that the first application is inactive in the first application instance of the client machine. Conversely, instructions are provided to withhold sending the request to the server in response to the determination that the first application is active in the first application instance of the client machine.

Other features and advantages of this invention will become apparent from the following detailed description of the presently preferred embodiment of the invention, taken in conjunction with the accompanying drawings.

DESCRIPTION OF THE PREFERRED EMBODIMENT

Technical Details

In the following description of the embodiments, reference is made to the accompanying drawings that form a part hereof, and in which is shown by way of illustration the specific embodiments in which the invention is practiced. It is to be understood that other embodiments may be utilized because structural changes may be made without departing from the spirit and scope of the present invention.

Figure 1:
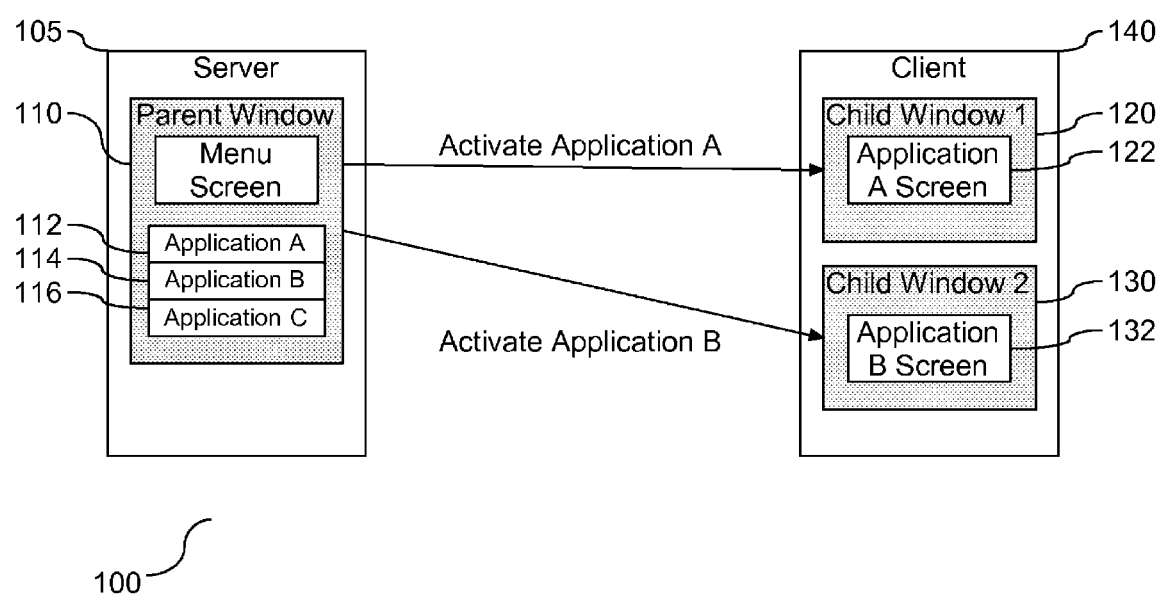
FIG. 1 is a prior art block diagram of a parent window and multiple child windows.
Figure 2:
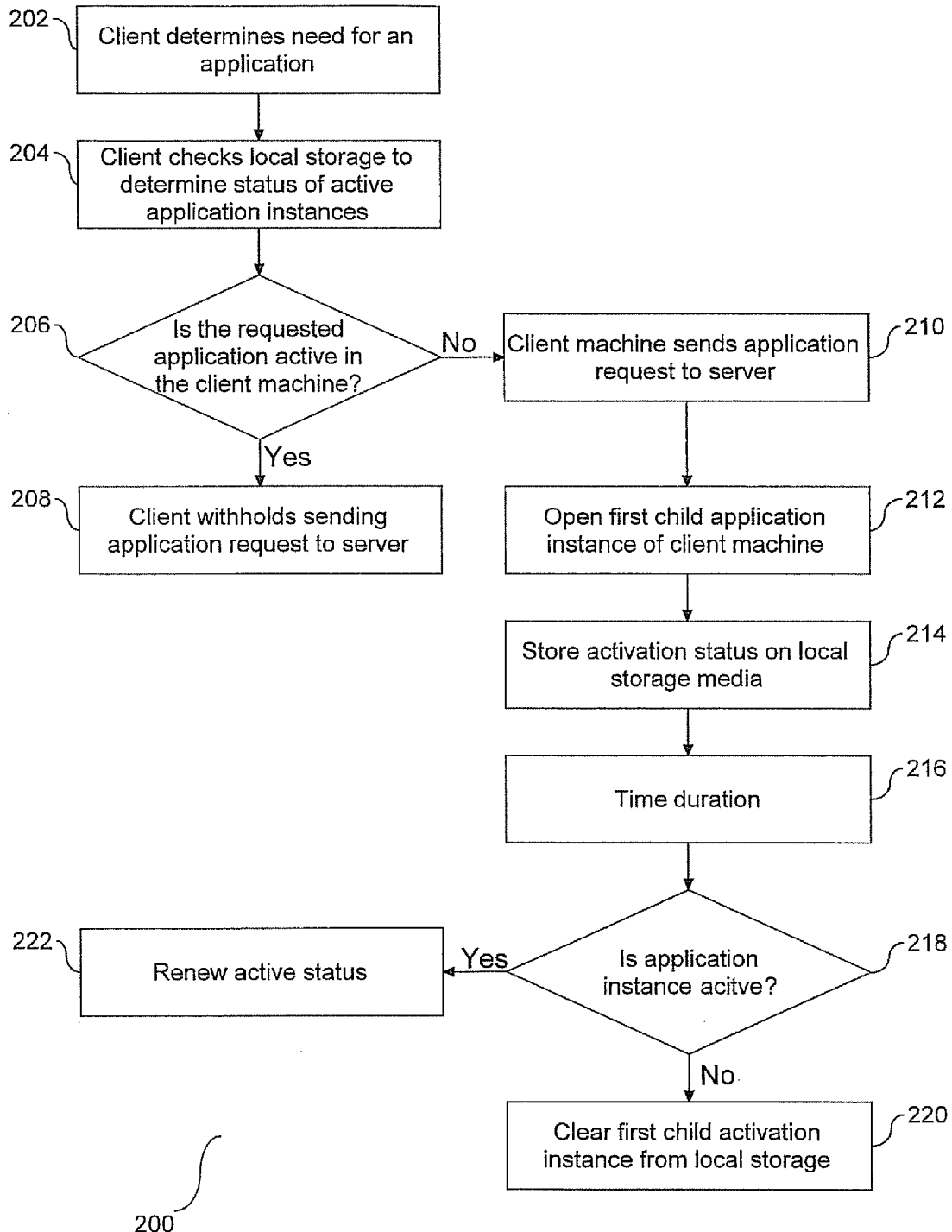
FIG. 2 is a flow chart illustrating a process for managing one or more child windows of a visual display of a client machine according to the preferred embodiment of this invention, and is suggested for printing on the first page of the issued patent.

FIG. 2 is a flow chart (200) illustrating a process for managing one or more application instances of a client machine. Initially, the client machine determines a need to request start of an application from a server in communication with the client machine (202). Prior to sending the request to the server, the client machine checks storage media local to the client machine to determine the status of any active application instances on the client machine (204). For purposes of explanation, an application instance is an open use of an application on a client machine from a server as may be reflected in a window of a visual display associated with the client machine. The active status of applications and/or their associated windows within the client machine are stored local to the client machine. By checking the activation status of one or more application instances prior to communication with the server, network traffic is mitigated. Following step (204), it is determined if the requested application is active in the client machine (206). In one embodiment, an active application instance is reflected on a window in an associated visual display. However, the invention should not be limited to visual affects shown in the windows of the visual display. In one embodiment, an application instance may be active although not directly or indirectly visible on the associated visual display. In response to the determination at step (206), the client machines checks local storage to determine the status of the application instance(s). A positive response to the determination at step (206) will result in the client machine withholding sending of the application request to the server (208). Conversely, a negative response to the determination at step (206) will result in the client machine sending the application request to the server (210). Accordingly, prior to communicating an application request to a server, the client machine locally determines whether the application instance is active local to the client machine.

As noted above, the status of an application instance local to a client machine is maintained on storage media local to the client machine. Following the client machine sending an application request to the server at step (210), the application request is granted and an application instance for the requested application becomes active on the client machine (212). In one embodiment, a first child window for the requested application instance is opened on the visual display local to the client machine. At such time as the application instance is active at step (212), data associated with activation of the application instance and/or the associated child window is stored on storage media local to the client machine (214). In one embodiment, the data associated with the application instance includes time duration. The time duration serves as a monitoring tool to enable other requests to activate the same application by the same client machine to be granted.

As noted at step (214) the application data on the client machine may include time duration. In such circumstances, after the time duration has lapsed (216), it is determined if the application instance open on the subject client machine is active (218). A positive response to the determination at step (218) will result in renewal of the active status of the application instance on the client machine (222). Conversely, a negative response to the determination at step (218) will result in clearing data of the subject application instance from local storage of the client machine (220). Clearing of the data enables activation of the application in a different child application instance as may be reflected in a different window on the visual display associated with the client machine. With respect to the expiration data, at such time as the time duration has expired, the application instance on the client machine will become inactive unless the time duration has been restored. In one embodiment, the time duration is restored by an indicator that the application instance on the client machine is active. Examples of an active application indicator with respect to a windows environment may include display of data in the associated child window, or display of the child window in the visual display. Accordingly, activation of an application instance local to a client machine from a server may be monitored locally through the expiration data in the local storage media.

As noted above, data associated with an application instance on a client machine from a server is maintained local to the client machine. In one embodiment, the data is maintained in a cookie. More specifically, a cookie is implemented to store data associated with an application local to a client machine. A cookie is information that is stored by a server on a client machine of a client/server communication system. Typically, a cookie records the preferences of the client machine as the server does not store data of what pages it has sent to a client machine. As such, a cookie is a mechanism that allows the server to store its own information about the client machine on the client machine. With respect to window management, the server may store data in the cookie pertaining to an active window in a client machine for a specific application. In one embodiment, a client side script is employed to track activation of one or more application instances on a client machine for a server application. A client script is a program that may accompany an HTML document or be embedded directly into the document. Scripts offer a means to extend HTML documents in highly active and interactive ways. The script program executes on the client machine when the document loads, or at some other time the link is activated. In one embodiment, the program may execute when the application instance is activated for the server application. Support for the script is independent of the scripting language. Accordingly, the script can both store information in the cookie and check on information stored in the cookie local to the client machine.

The following is pseudo-code processing data associated with an application when an application instance is active on a local client machine:

expiration=new Date ((new Date ( ). GetTime( ))+300000);
    data="APPL_OPEN=YES"; expires="+expiration.toGMTString( )";
    document.cookie=data;

In this example, the expiration data of the cookie is configured as five minutes, or 300,000 milliseconds after the time of opening the application on the local client machine. It should be noted that the five minute expiration of the application is merely for exemplary purposes. By configuring the expiration date of the cookie and continuing to dynamically update the cookie, it is possible to avoid a condition of unintended termination of the application. Accordingly, setting and renewing the expiration data of a cookie enables control of the active status of an application instance based upon time duration.

Besides setting time expiration for the application local to the client machine, an application instance on the client machine may be properly closed. In the case of a window environment, an application instance may be terminated by the closing of a window. The following is pseudo-code processing data associated with closing the application instance on the client machine:

expiration=new Date ((new Date ( ).getTime( ))+300000);
    data="APPL_OPEN=NO"; expires="+expiration.toGMTString( )";
    document.cookie=data;

As shown, in one embodiment, recordation of the window closing in the storage media is implemented by rewriting the cookie. It should be noted that the expiration data of the cookie may be extended under limited circumstances, as described above.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 3:
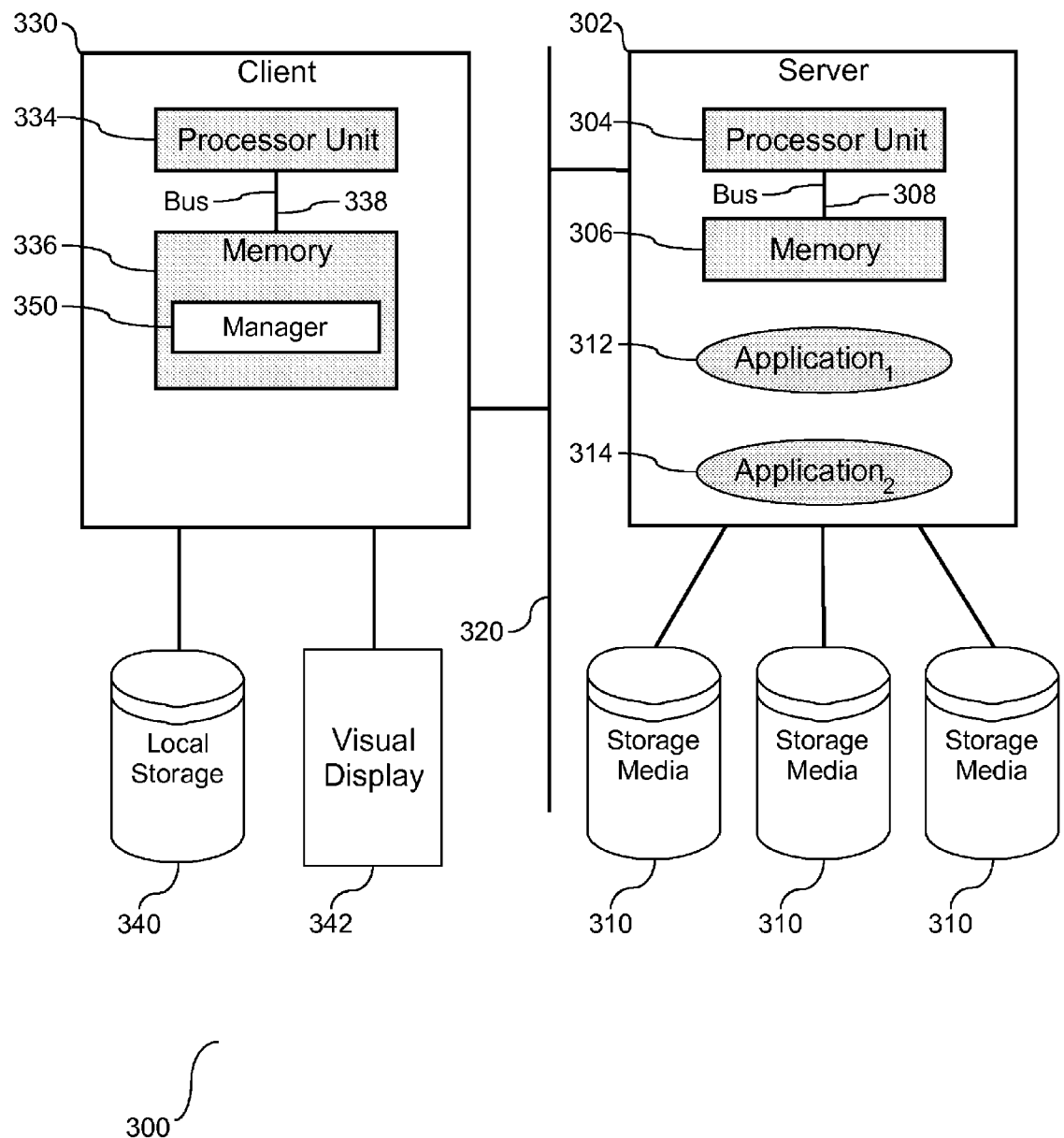
FIG. 3 is a block diagram illustrating placement of a window management tool in a computer system.

FIG. 3 is a block diagram (300) illustrating placement of a window management tool in a computer system. The illustration shows a server (302) with a processor unit (304) coupled to memory (306) by a bus structure (308). Although only one processor unit (304) is shown, in one embodiment, the server (302) may include more processor units in an expanded design. As shown in FIG. 3, the server (302) may include one or more storage media (310) in communication with the processor unit (304). The server manages execution of one or more applications (312) and (314). Although only two applications (312) and (314) are shown herein, the invention should not be limited to this quantity of applications.

The server (302) is in communication with a client machine (330) across a network (320). The client machine (330) includes a processor unit (334) coupled to memory (336) by a bus structure (338). The client machine (330) also includes local storage media (340) and an associated visual display unit (342). Although only one visual display unit (342) is shown, in one embodiment, the client machine (330) may include more visual display units in an expanded design. An application management tool in the form of a manager (350) is shown residing in memory (336) of the client machine (330). The manager (350) mediates and facilitates opening and closing of one or more application instances on a client machine and/or associated child windows for each application on the visual display unit(s) (342). The manager (350) may utilize instructions in a computer readable medium to mediate opening and closing of application instances on the client machine (330). Although the manager (350) is shown residing in memory (336), the invention should not be limited to this embodiment. In one embodiment, the manager (350) may reside as a hardware tool external to memory (336), or it may be implemented as a combination of hardware and software. Accordingly, the manager (350) may be implemented as a software tool or a hardware tool to facilitate mediation and management of application instances and/or associated child windows in a visual display unit of a client machine.

Embodiments within the scope of the present invention also include articles of manufacture comprising program storage means having encoded therein program code. Such program storage means can be any computer readable storage media which can be accessed by a general purpose or special purpose computer. By way of example, and not limitation, such program storage means can include RAM, ROM, EEPROM, CD-ROM, or other optical disk storage, magnetic disk storage or other magnetic storage devices or any other medium which can be used to store the desired program code means and which can be accessed by a general purpose or special purpose computer. Combinations of the above should also be included in the scope of the program storage means.

The storage medium can be an electronic, magnetic, optical, electromagnetic, infrared, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Upon requesting execution of an application from a server and receiving authorization for the execution, an application instance is opened on the client machine. In one embodiment, opening of an application on a client machine is reflected with the opening of a child window on a visual display local to the client machine. In order to deter execution of multiple instances of the application on a client machine, it is determined if the application is active on the client machine as a first instance before execution of the application for a second instance by the server. Status of the instances of the application(s) is determined local to the client machine and prior to communication with the server. Accordingly, application instance management and associated data is maintained local to the client machine.

Alternative Embodiments

It will be appreciated that, although specific embodiments of the invention have been described herein for purposes of illustration, various modifications may be made without departing from the spirit and scope of the invention. In particular, the invention should not be limited to a single visual display in communication with the client machine. More specifically, the client machine may have two or more visual displays that can accommodate opening of one or more windows thereon. In one embodiment, a browser is employed local to a client machine to display an application hosted by a server. It is known in the art, that the browser may fail or experience a failure, which results in an abnormal termination of the browser and the association application executing on the browser. An abnormal termination of the browser does not support clearing data of client machine local storage media associated with activation status of one or more application instances. In such circumstances, the application instance from the server can be started again from a new child window after the time or expiration of the application instance subject to the failure. Accordingly, the scope of protection of this invention is limited only by the following claims and their equivalents.

I claim:

1. A method for managing application instances in a computing environment, said method comprising:
   a client machine ascertaining that a first instance of an application is active in the client machine, said application being stored in a server machine in communication with the client machine across a network disposed between the client machine and the server machine;
   in response to said ascertaining that the first instance is active in the client machine, said client machine withholding sending a request for the server machine to cause an application instance of the application to become active in the client machine;
   after said ascertaining and said withholding, said client machine determining that no instance of the application is active in the client machine;
   in response to said determining that no instance of the application is active in the client machine, said client machine sending to the server machine a request for the server machine to cause the application instance of the application to become active in the client machine, said application instance becoming active in the client machine as a result of the server machine having responded to the sent request;
   in response to the application instance becoming active in the client machine, storing application data on storage media local to the client machine, said stored application data comprising an active status indicator and a time duration, said active status indicator indicating that the application instance is active in the client machine, said time duration measured from a time at which the application instance has become active in the client machine; and
   determining that the time duration has lapsed; and
   responsive to said determining that the time duration has lapsed, deleting the active status indicator from the application data on the storage media.

2. The method of claim 1, said method further comprising:
   after said deleting the active status indicator from the application data, determining that the application instance is still active in the client machine; and
   in response to said determining that the application instance is still active in the client machine, restoring the active status indicator and the time duration in the application data on the storage media.

3. The method of claim 1, said method further comprising:
   after said deleting the active status indicator from the application data, determining that the application instance is no longer active in the client machine; and
   in response to said determining that the application instance is no longer active in the client machine, clearing the application data from the storage media.

4. The method of claim 1, wherein said storing the application data comprises storing the application data in a cookie on the storage media.

5. The method of claim 4, wherein said application instance becoming active in the client machine comprises said application instance being opened in a display window local to the client machine, and wherein the method further comprises:
   closing the display window which causes the application instance to no longer be active in the client machine; and
   in response to said closing the display window, recording said closing the display window by changing the active status indicator in the cookie to an inactive status indicator indicating that the application instance is not active in the client machine.

6. A computer program product, comprising a computer readable storage device having a computer readable program code stored therein, said computer readable program code containing instructions configured to be executed by a processor of a client machine to implement a method for managing application instances in a computing environment, said method comprising:
   a client machine ascertaining that a first instance of an application is active in the client machine, said application being stored in a server machine in communication with the client machine across a network disposed between the client machine and the server machine;
   in response to said ascertaining that the first instance is active in the client machine, said client machine withholding sending a request for the server machine to cause an application instance of the application to become active in the client machine;
   after said ascertaining and said withholding, said client machine determining that no instance of the application is active in the client machine;
   in response to said determining that no instance of the application is active in the client machine, said client machine sending to the server machine a request for the server machine to cause the application instance of the application to become active in the client machine, said application instance becoming active in the client machine as a result of the server machine having responded to the sent request;

in response to the application instance becoming active in the client machine, storing application data on storage media local to the client machine, said stored application data comprising an active status indicator and a time duration, said active status indicator indicating that the application instance is active in the client machine, said time duration measured from a time at which the application instance has become active in the client machine; and determining that the time duration has lapsed; and responsive to said determining that the time duration has lapsed, deleting the active status indicator from the application data on the storage media.

7. The computer program product of claim 6, said method further comprising:

after said deleting the active status indicator from the application data, determining that the application instance is still active in the client machine; and in response to said determining that the application instance is still active in the client machine, restoring the active status indicator and the time duration in the application data on the storage media.

8. The computer program product of claim 6, said method further comprising:

after said deleting the active status indicator from the application data, determining that the application instance is no longer active in the client machine; and in response to said determining that the application instance is no longer active in the client machine, clearing the application data from the storage media.

9. The computer program product of claim 6, wherein said storing the application data comprises storing the application data in a cookie on the storage media.

10. The computer program product of claim 9, wherein said application instance becoming active in the client machine comprises said application instance being opened in a display window local to the client machine, and wherein the method further comprises:

closing the display window which causes the application instance to no longer be active in the client machine; and in response to said closing the display window, recording said closing the display window by changing the active status indicator in the cookie to an inactive status indicator indicating that the application instance is not active in the client machine.

11. A system comprising a client machine, said client machine comprising a processor and a computer readable memory unit coupled to the processor, said memory unit containing instructions configured to be executed by the processor to implement a method for managing application instances in a computing environment, said method comprising:

a client machine ascertaining that a first instance of an application is active in the client machine, said application being stored in a server machine in communication with the client machine across a network disposed between the client machine and the server machine;

in response to said ascertaining that the first instance is active in the client machine, said client machine withholding sending a request for the server machine to cause an application instance of the application to become active in the client machine;

after said ascertaining and said withholding, said client machine determining that no instance of the application is active in the client machine;

in response to said determining that no instance of the application is active in the client machine, said client machine sending to the server machine a request for the server machine to cause the application instance of the application to become active in the client machine, said application instance becoming active in the client machine as a result of the server machine having responded to the sent request;

in response to the application instance becoming active in the client machine, storing application data on storage media local to the client machine, said stored application data comprising an active status indicator and a time duration, said active status indicator indicating that the application instance is active in the client machine, said time duration measured from a time at which the application instance has become active in the client machine; and determining that the time duration has lapsed; and responsive to said determining that the time duration has lapsed, deleting the active status indicator from the application data on the storage media.

12. The system of claim 11, said method further comprising:

after said deleting the active status indicator from the application data, determining that the application instance is still active in the client machine; and in response to said determining that the application instance is still active in the client machine, restoring the active status indicator and the time duration in the application data on the storage media.

13. The system of claim 11, said method further comprising:

after said deleting the active status indicator from the application data, determining that the application instance is no longer active in the client machine; and in response to said determining that the application instance is no longer active in the client machine, clearing the application data from the storage media.

14. The system of claim 11, wherein said storing the application data comprises storing the application data in a cookie on the storage media.

15. The system of claim 14, wherein said application instance becoming active in the client machine comprises said application instance being opened in a display window local to the client machine, and wherein the method further comprises:

closing the display window which causes the application instance to no longer be active in the client machine; and in response to said closing the display window, recording said closing the display window by changing the active status indicator in the cookie to an inactive status indicator indicating that the application instance is not active in the client machine.

* * * * *